United States Patent
Cromer et al.

(10) Patent No.: US 7,434,738 B2
(45) Date of Patent: Oct. 14, 2008

(54) METHOD AND SYSTEM FOR CONFIGURING A COMMUNICATION CARD IN A COMPUTER SYSTEM

(75) Inventors: Daryl Carvis Cromer, Apex, NC (US); Philip John Jakes, Durham, NC (US); Raymond Gary Octaviano, II, Raleigh, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 98 days.

(21) Appl. No.: 11/081,343

(22) Filed: Mar. 15, 2005

(65) Prior Publication Data

US 2006/0208093 A1    Sep. 21, 2006

(51) Int. Cl.
*G06K 19/06* (2006.01)

(52) U.S. Cl. ...................... 235/492; 235/486

(58) Field of Classification Search ............... 235/492, 235/486, 487, 380, 449, 375; 455/434, 500, 455/41.2, 426.1, 435.3

See application file for complete search history.

(56) References Cited

U.S. PATENT DOCUMENTS

| | | | | |
|---|---|---|---|---|
| 4,743,747 | A * | 5/1988 | Fougere et al. | 235/494 |
| 5,134,648 | A * | 7/1992 | Hochfield et al. | 379/93.29 |
| 5,712,977 | A * | 1/1998 | Glad et al. | 710/10 |
| 5,794,052 | A * | 8/1998 | Harding | 717/178 |
| 6,173,405 | B1 | 1/2001 | Nagel | 713/200 |
| 6,751,476 | B2 | 6/2004 | Masaki et al. | 455/558 |
| 7,103,314 | B2 * | 9/2006 | Li | 455/41.2 |
| 2002/0064260 | A1 | 5/2002 | Longman et al. | 379/106.02 |
| 2003/0033545 | A1 | 2/2003 | Wenisch et al. | 713/202 |
| 2004/0127240 | A1 * | 7/2004 | Li | 455/500 |
| 2006/0019660 | A1 * | 1/2006 | Li | 455/434 |

* cited by examiner

*Primary Examiner*—Thien M. Le
(74) *Attorney, Agent, or Firm*—Sawyer Law Group LLP

(57) ABSTRACT

A method of configuring a communication card in a computer system comprises retrieving information relating to a country in which the computer system will be used from the computer system into the communication card. Based on the retrieved information, the communication card selects a configuration setting from a plurality of configuration settings stored in the communication card, and loads the selected configuration setting into memory in the communication card.

17 Claims, 2 Drawing Sheets

METHOD AND SYSTEM FOR CONFIGURING A COMMUNICATION CARD IN A COMPUTER SYSTEM

FIELD OF THE INVENTION

The present invention relates to computer systems, and more particularly to a method and system for configuring a communication card in a computer system.

BACKGROUND OF THE INVENTION

Communication between electronic devices via a wireless network is fast becoming the standard mode of communication around the world. In its simplest form, an electronic device that is capable of wireless communication is a radio that transmits and receives data using radio frequencies. Various countries designate specific channels and frequency ranges for unlicensed use by electronic devices. Accordingly, the electronic device should be configured to use specified channels and specified frequencies to comply with the regulations promulgated by the country in which the device is being used.

Communication cards are commonly used in electronic computer systems, such as notebook and desktop computers, to enable the systems to communicate with other devices and/or systems through a network. In particular, a wireless communication card, or wireless adapter card, allows the computer system to connect to the wireless network, e.g., a wireless local area network (WLAN), for accessing the Internet or other systems on the network. Typically, a manufacturer of wireless adapter cards can provide cards having different configurations to meet the various communication regulations throughout the world. For instance, one wireless adapter card can be configured for the United States, while another card can be configured for Europe or Japan. Accordingly, depending on the country in which the computing device is used, an appropriate adapter card can be selected and installed.

Often, the computer system is assembled with the wireless adapter card installed so that the computer can provide out-of-the-box wireless functionality. To ensure that the appropriate wireless adapter card is installed, the consumer need only designate the country in which the computer will be used and the corresponding wireless adapter card can be selected and installed during the computer's assembly.

Computer manufacturers that assemble, sell and repair computers for consumers around the world typically stock several different wireless adapter cards having different configurations. Each differently configured adapter card is associated with a distinct part number, known as a stock keeping unit (SKU), because the cards are not interchangeable. Typically, the level of inventory for each part number is determined by a demand forecast. Nevertheless, if the demand forecast is inaccurate or if an order changes significantly (more or fewer units requested), surpluses or shortages of parts can result. In the event of a shortage, e.g., a particular adapter card is out-of-stock, the adapter card must be re-ordered, resulting in delays in delivering a shipment of computers. In the event of a surplus, the overstocked card can be returned to the card manufacturer for reconfiguration, but this results in additional expenses.

Accordingly, what is needed is a method and system for configuring a communication card in a computer system. The method and system should simplify a manufacturer's inventory system for communication cards and reduce the likelihood of shortages or surpluses of particular communication cards. The present invention addresses such a need.

BRIEF SUMMARY OF THE INVENTION

In one embodiment, a method of configuring a communication card in a computer system includes retrieving information relating to a country in which the computer system will be used from the computer system into the communication card. Based on the retrieved information, the communication card selects a configuration setting from a plurality of configuration settings stored in the communication card, and loads the selected configuration setting into memory in the communication card.

According to the embodiment of the present invention, a computer system manufacturer or repair shop can stock a single communication card that can be used in any computer system, instead of stocking several differently configured cards. Because the communication card is self-configuring according to the specifications of the computer system into which it is installed, the problems associated with a surplus or a shortage of a particular type of communication card is eliminated.

DETAILED DESCRIPTION OF THE INVENTION

The present invention relates to computer systems, and more particularly to a method and system for configuring a communication card in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

Figure 1:
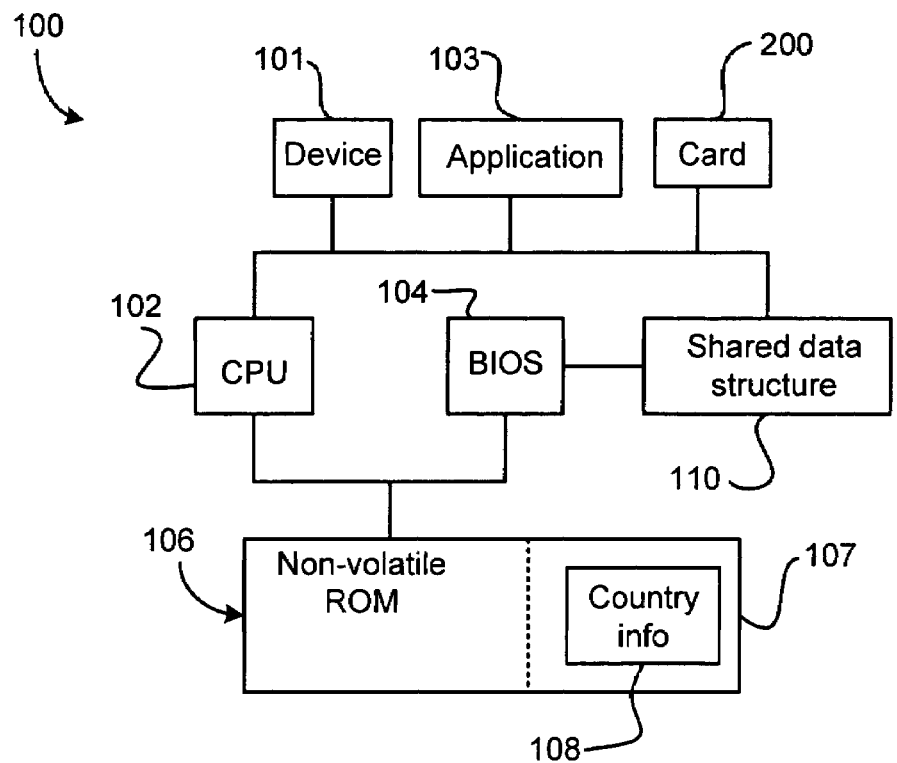
FIG. 1 is a block diagram of a computer system according to an embodiment of the present invention.

FIG. 1 is a schematic block diagram of a computer system according to an embodiment of the present invention. The computer system 100 can be a desktop or laptop computer or any other system that uses a communication card, e.g., a PDA or the like. The computer system 100 includes at least one central processing unit (CPU) 102, a non-volatile read only memory structure 106, a plurality of peripheral devices 101, applications 103, and at least one communication card 200. The CPU 102 generally controls the interaction between the various devices 101, cards 200, and applications 103 in a known manner. The non-volatile read only memory structure 106 can be an electrically erasable programmable ROM (EEPROM) that includes a locked section 107 that stores permanent information, such as the system's serial number. The peripheral devices 101, applications 103, and at least one communication card 200 are generally coupled to the CPU 102 via conventional means, such as a bus.

The computer system 100 also includes a BIOS module 104 that performs a boot sequence when the computer system 100 is powered up or restarted. The BIOS module 104 has access to the non-volatile ROM 106 and is also coupled to a shared data structure 110. The shared data structure 110 is accessible by the peripheral devices 101, applications 103, and at least one communication card 200. In one embodiment, the shared data structure 110 can be a system management BIOS (SMBIOS) or any other data structure that is accessible to the peripheral devices 101, applications 103, and at least one communication card 200. The SMBIOS 110 typically includes general information about the computer system 100, e.g., CPU type, clock speed, storage capacity, etc., that is useful to the peripheral devices 101, applications 103, and the communication cards 200.

Figure 2:
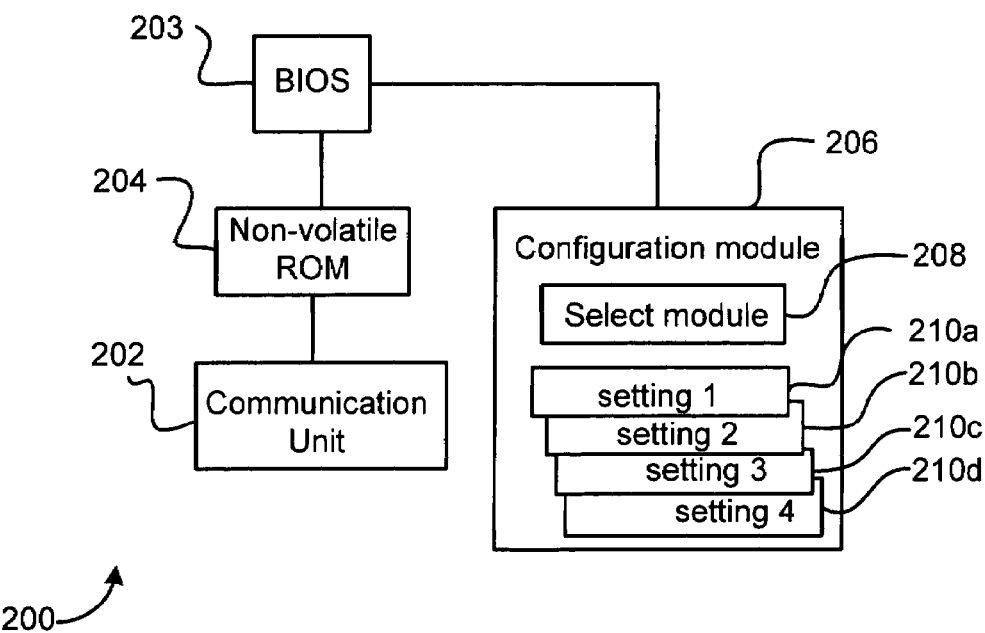
FIG. 2 is block diagram of a communication card according to an embodiment of the present invention.

FIG. 2 is a schematic block diagram of a communication card 200 according to an embodiment of the present invention. The communication card 200 includes a communication card BIOS 203, a non-volatile ROM 204, a communication unit 202 and a configuration module 206. According to a preferred embodiment, the configuration module 206 includes a selection module 208 and a plurality of configuration settings 210*a*–210*d*. Each configuration setting 210*a*–210*d* is associated with one or more countries. For example, the configuration setting 210*a* can include radio settings for wireless communication in a particular country. The configuration setting 210*a* can also include enabling or disabling certain features, e.g., OFDM modulation, 5 GHz radios, according to regulations in a particular country.

The configuration module 206 is coupled to the BIOS 203 that is coupled to the non-volatile ROM 204, which is accessible by the communication unit 202. The communication unit 202 provides the functionality of the communication card 200 in a known manner using the configuration settings that comply with the country in which the computer system 100 is used.

In contrast to conventional methods, the communication card 200 is not configured, i.e., the radio settings in the communication card 200 are not set, at the time of assembly of the computer system 100. Rather, according to a preferred embodiment, the communication card 200 configures itself during a first booting sequence by interrogating the computer system 100 for information relating to which country the computer system 100 will be used, and then selecting and loading the appropriate configuration setting 210*a*–210*d* corresponding to the country of use.

Figure 3:
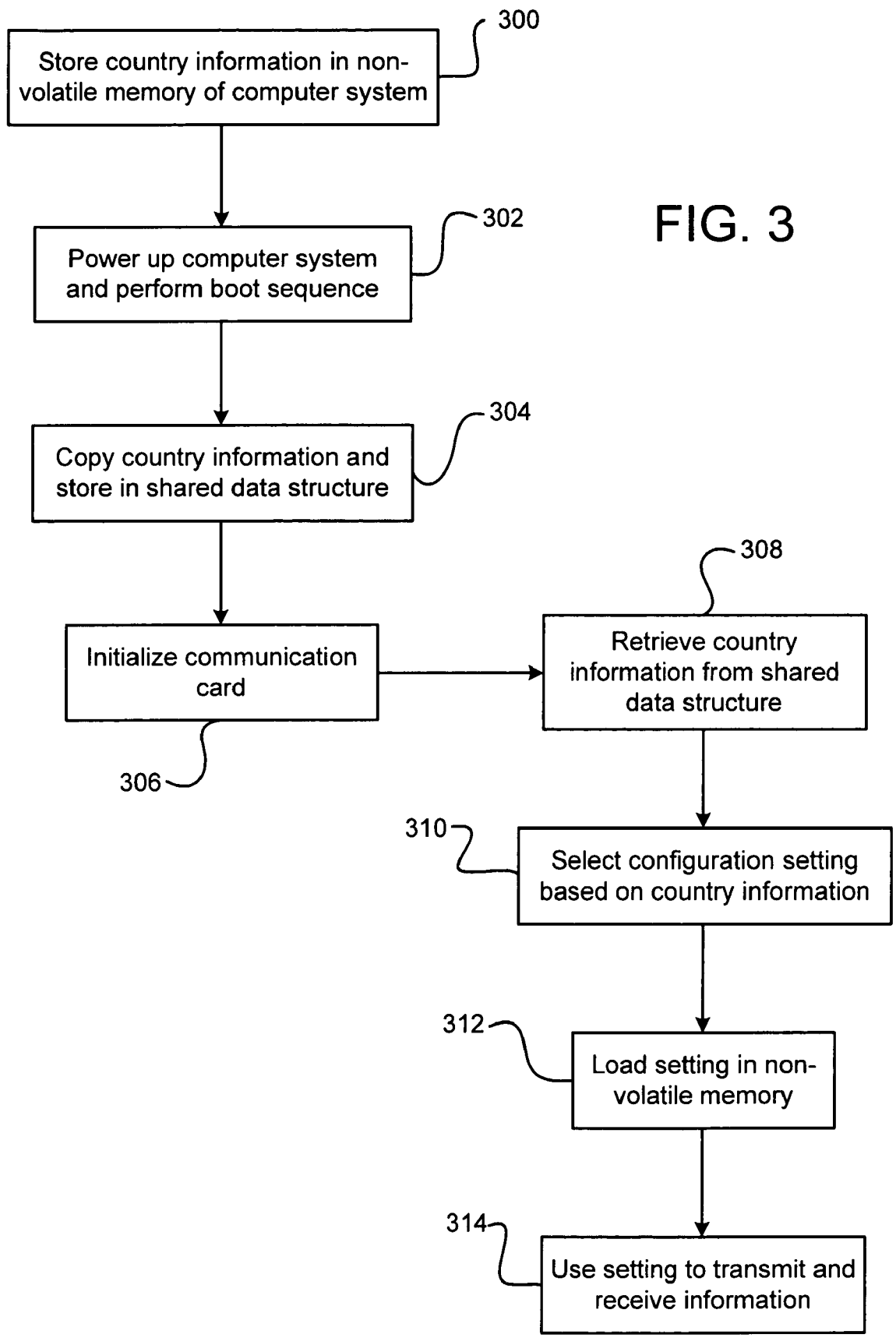
FIG. 3 is a flowchart illustrating a process of configuring a communication card in a computer system according to an embodiment of the present invention.

FIG. 3 is a flowchart illustrating a process for configuring the communication card 200 according to a preferred embodiment of the present invention. Referring to FIG. 1, FIG. 2 and FIG. 3, the process begins by storing information 108 relating to the country of use (referred to as "country information") in the locked section 107 of the non-volatile read only memory structure 106, e.g., EEPROM, of the computer system 100 (step 300). In a preferred embodiment, the country information 108 is a setting indicator that corresponds to the country in which the computer system 100 will be used and indicates which configuration setting out of a plurality of configuration settings 210*a*–210*d* will be used for the communication card 200.

In a preferred embodiment, the setting indicator 108 is determined when the consumer identifies the country of use during an ordering process. During assembly of the computer system 100, the setting indicator 108 can be stored in the locked section 107 of the EEPROM 106 in a manner known to those skilled in the art. By storing the setting indicator 108 in the locked section 107, the information can be altered only by authorized personnel who have access to the locked section 107. Accordingly, the setting indicator 108 cannot be changed by an end user or a thief.

Once the country information 108 is stored in the EEPROM's locked section 107, the computer system 100 is powered up and the BIOS 104 performs an initial boot sequence (step 302). During the boot sequence, the BIOS 104 generally performs diagnostic tests to ensure that system hardware, e.g., peripheral devices 101, communication cards 200, is present and operating properly. The BIOS 104 can perform a "system inventory" to determine what sort of hardware is in the computer system 100.

According to a preferred embodiment of the present invention, the BIOS 104 copies the setting indicator 108 from the locked section 107 of the EEPROM 106 and stores it in the shared data structure 110 (step 304). As stated above, the shared data structure 110 can be the SM BIOS, or any other data structure 110 that is accessible by the peripheral devices 101, applications 103, and communication cards 200.

During the boot sequence, the BIOS 104 initializes the communication card 200 by locating and executing the communication card BIOS 203 in the communication card 200 (step 306). As stated above, when assembled, the communication card 200 is not configured. Accordingly, when the communication card BIOS 203 checks for configuration settings in the card's non-volatile ROM 204, it will find that the settings are not present. In that case, the communication card BIOS 203 calls the configuration module 206, which checks the SM BIOS 110 in the computer system 100 and retrieves the setting indicator 108 stored therein (step 308).

The select module 208 in the configuration module 206 uses the setting indicator 108 to select a configuration setting, e.g., 210*a*, corresponding to the setting indicator 108 (step 310), and the selected configuration setting 210*a* is then loaded into the communication card's non-volatile ROM 204 (step 312) thereby configuring the communication card 200. Once the card is configured, the communication unit 202 uses the configuration setting 210*a* to transmit and receive information over a network (step 314). In a preferred embodiment, the configuration setting 210*a* for the communication card 200 is permanently stored in the non-volatile ROM 204 if required by government regulations.

According to a preferred embodiment of the present invention, if a configured communication card 200 fails, a replacement communication card 200 that is not configured can be shipped to the end user and installed in the computer system 100. To configure the replacement communication card, steps 306 through 314 of FIG. 3 can be performed because the setting indicator 108 is stored in the computer system 100. Similarly, instead of building the computer system 100 with the communication card 200, the communication card 200 can be installed after assembly as an option. Again, in this situation, the newly installed communication card 200 can configure itself by retrieving the setting indicator 108 from the computer system 100 (step 308), selecting the appropriate configuration setting 210*a* based on the setting indicator 108 (step 310), and loading the configuration setting 210*a* into the card's EEPROM 204.

According to versions of the present invention, a communication card that configures itself after it is installed in a computer system is provided. In a preferred embodiment, the communication card retrieves information relating to a country of use from the computer system in which the card is installed, and uses the retrieved information to select and load a corresponding configuration setting. The configuration setting can include radio settings and instructions for enabling or disabling certain features according to regulations in a particular country, and the configuration setting preferably is permanent.

By allowing the communication card to configure itself after installation/assembly, computer system manufacturers, computer repair shops, and options warehouses need only stock one communication card, instead of several differently configured cards. The number of part numbers can be reduced accordingly, and the problems associated with poor or incorrect demand forecasting resulting in shortages or surpluses is eliminated.

The present invention is directed to configuring a communication card in a computer system. The present invention has been described in accordance with embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for configuring a communication card coupled to a computer system, the method comprising:
   determining whether the communication card is configured; and
   calling a configuration module of the communication card in response to a determination that the communication card is not configured,
   in response to being called, the configuration module of the communication card retrieves information stored in the computer system, the information relating to a country in which the computer system will be used,
      selects a configuration setting based on the retrieved information from a plurality of configuration setting based on the retrieved information from a plurality of configuration settings stored in the communication card, and
      loads the selected configuration setting into a non-volatile read only memory structure of the communication card.

2. The method of claim 1 further including:
   determining from an end user the country in which the computer system is to be used;
   selecting a setting indicator corresponding to the country; and storing the setting indicator in a locked section of non-volatile read only memory of the computer system.

3. The method of claim 2 further including:
   performing a system boot sequence;
   copying the setting indicator from the locked section of the non-volatile read only memory; and
   storing the setting indicator in a shared data structure in the computer system, the shared data structure being accessible by the communication card.

4. The method of claim 3, wherein the shared data structure is a system management BIOS.

5. The method of claim 3, wherein retrieving the information from the computer system includes checking the shared data structure for the setting indicator and retrieving the setting indicator from the shared data structure.

6. The method of claim 1, wherein loading the configuration setting includes storing the configuration setting in the non-volatile read only memory structure of the communication card.

7. The method of claim 1, wherein loading the configuration setting includes permanently storing the configuration setting in the non-volatile read only memory structure of the communication card.

8. A communication card coupled to a computer system, the communication card comprising:
   a nonvolatile read only memory structure;
   a configuration module coupled to the non-volatile read only memory structure; and
   a BIOS coupled to the configuration module, the BIOS
      determines whether the communication card is configured, and
      calls the configuration module in response to a determination that the communication card is not configured,
   in response to being called, the configuration module
      retrieves information stored in the computer system, the information relating to a country in which the computer system will be used
      selects a configuration setting from a plurality of configuration settings stored in the communication card based on the retrieved information, and
      loads the selected configuration setting into the non-volatile read only memory structure.

9. The communication card of claim 8, wherein loading the selected configuration setting includes storing the selected configuration setting in the non-volatile read only memory structure.

10. The communication card of claim 8, wherein loading the selected configuration setting includes permanently storing the configuration setting in the non-volatile read only memory structure.

11. A computer system comprising:
   at least one CPU;
   a non-volatile read only memory structure coupled to the at least one CPU, the memory structure including a locked section;
   a system BIOS coupled to the at least one CPU;
   a shared data structure coupled to the system BIOS; and
   at least one communication card coupled to the CPU the communication card comprising:
      a non-volatile read only memory structure; and
      a configuration module coupled to the non-volatile read only memory structure, the configuration module for retrieving information stored in the computer system, the information relating to a country in which the computer system will be used, the configuration module comprising:
         a select module; and
         a plurality of configuration settings, wherein each configuration setting corresponds to at least one country,
      wherein the select module selects a configuration setting from the plurality of configuration settings stored in the communication card based on the retrieved information, and the configuration module loads the selected configuration setting into the non-volatile read only memory of the communication card.

12. The computer system of claim 11, further including a setting indicator corresponding to the country in which the computer system is to be used, wherein the setting indicator is stored in the locked section of the non-volatile read only memory structure of the computer system.

13. The computer system of claim 12, wherein the system BIOS performs a system boot sequence, copies the setting indicator from the locked section of the non-volatile read only memory structure, and stores the setting indicator in the shared data structure in the computer system.

14. The computer system of claim 13, wherein the configuration module checks the shared data structure for the setting indicator and retrieves the setting indicator from the shared data structure.

15. The computer system of claim 14, wherein the select module selects the configuration setting corresponding to the setting indicator.

16. The computer system of claim 11, wherein the configuration module permanently loads the selected configuration setting into the non-volatile read only memory of the communication card.

17. The computer system of claim 11, wherein the shared data structure is a system management BIOS.

* * * * *